No. 857,755. PATENTED JUNE 25, 1907.
J. B. PURL.
NUT LOCK.
APPLICATION FILED NOV. 24, 1906.
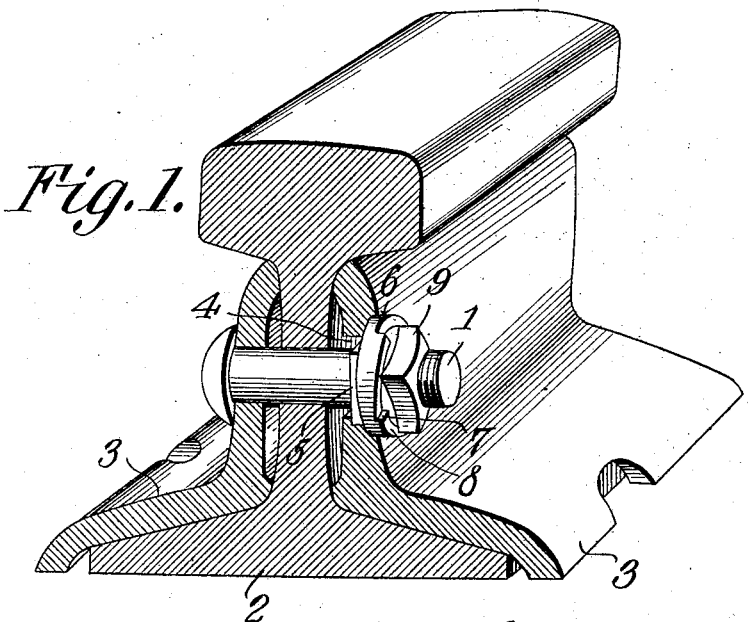
Fig. 1.
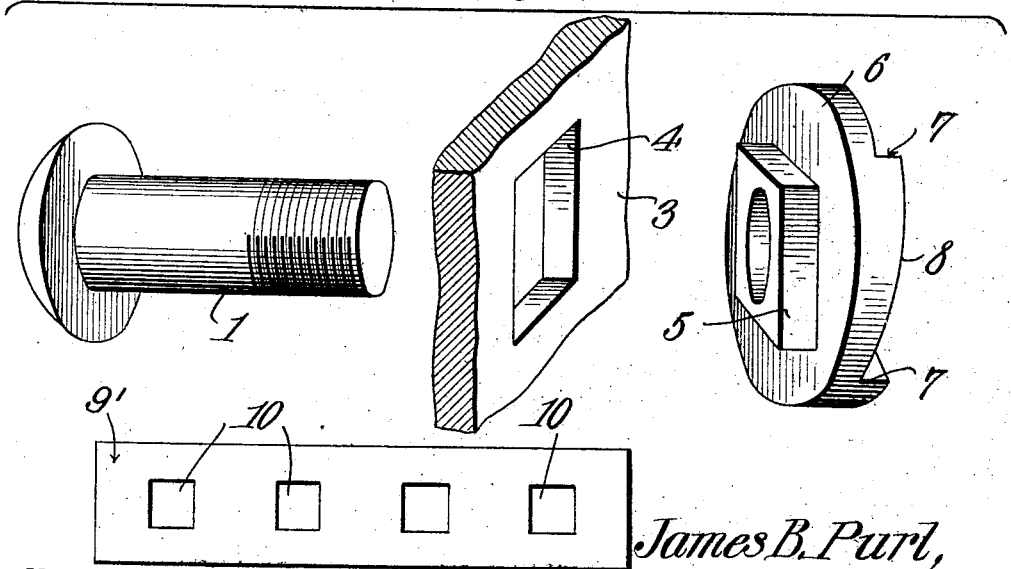
Fig. 2.
Fig. 3.
WITNESSES:
James B. Purl,
INVENTOR.
By C. A. Snow & Co.
ATTORNEYS

UNITED STATES PATENT OFFICE.

JAMES B. PURL, OF CHARLESTON, ILLINOIS.

NUT-LOCK.

No. 857,755.   Specification of Letters Patent.   Patented June 25, 1907.

Application filed November 24, 1906. Serial No. 344,924.

*To all whom it may concern:*

Be it known that I, JAMES B. PURL, a citizen of the United States, residing at Charleston, in the county of Coles and State of Illinois, have invented a new and useful Nut-Lock, of which the following is a specification.

This invention relates to nut locks and is particularly designed for use in fastening fish plates upon rails.

The object of the invention is to simplify and improve the construction of devices of this character and to provide a lock which will absolutely prevent the nut from being detached from a bolt except by cutting it therefrom.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a perspective view showing the lock in use for securing fish plates to the rail; Fig. 2 is a detail view showing the parts of the lock disconnected; and Fig. 3 is a detail view of a modified form of washer holding device.

Referring to the figures by characters of reference, 1 is a bolt of the usual construction adapted to be inserted through the web of a rail 2 and through the fish plates 3. One of the fish plates is provided with an angular opening 4 adapted to receive a corresponding angular boss 5 formed upon the inner face of a washer 6. The opposite face of this washer is formed with a series of shoulders 7 having inclined or cam faces 8 interposed therebetween. These shoulders are adapted to be successively contacted by the corners of a nut 9 when the same is rotated upon the bolt 1 and said corners will ride over the shoulders and force the washer against the fish plate 3 with sufficient force to spring the same inward. As soon as the corners pass over the shoulders 7 the inwardly pressed fish plate will spring outward to normal position and cause the shoulders to assume positions back of the corners of the bolt. It therefore becomes impossible to detach the nut except by cutting it from the bolt. It is of course understood that the shoulders 7 are disposed at ninety degrees to each other so that all the corners of the nut 9 will be simultaneously engaged. The angular boss 5 projecting into the angular opening 4 will obviously prevent the washer 6 from rotating.

While the fish plate 3 has been shown provided with the opening 4 it is to be understood that if preferred a metal strip having a plurality of openings therein may be placed upon the fish plate so that each opening will receive one of a series of bolts. Such a strip has been shown in Fig. 3 where the body of the strip is represented by the character 9' and the openings by the character 10.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claims.

What is claimed is:

1. In a nut lock the combination with a bolt; of a washer, an angular boss extending from one face thereof, the opening in the washer extending through the boss, shoulders upon the opposite face of the washer at the periphery thereof, there being inclined arcuate faces between the shoulders, yielding means for engaging the boss to hold it against rotation, and a bolt engaging nut, all of said shoulders being disposed to simultaneously lap the corners of the nut to hold it against rotation in one direction.

2. In a nut lock the combination with a bolt; of a washer, an angular boss extending from one face thereof and surrounding the opening in the washer, shoulders upon the opposite face of the washer at the periphery thereof, there being inclined faces between the shoulders and outstanding from the washer concentrically therewith, a nut upon the bolt, all of said shoulders being designed to simultaneously lap the corners of the nut, and a resilient holding device having an angular aperture constituting a seat for the boss.

In testimony that I claim the foregoing as my own, I have hereto affixed my signature in the presence of two witnesses.

JAMES B. PURL.

Witnesses:
 MORTON P. HOUSE,
 I. O. DENMAN.